(12) United States Patent
Scott et al.

(10) Patent No.: US 9,483,272 B2
(45) Date of Patent: Nov. 1, 2016

(54) SYSTEMS AND METHODS FOR MANAGING RETURN STACKS IN A MULTI-THREADED DATA PROCESSING SYSTEM

(71) Applicant: FREESCALE SEMICONDUCTOR, INC., Austin, TX (US)

(72) Inventors: Jeffrey W. Scott, Austin, TX (US); William C. Moyer, Austin, TX (US); Alistair P. Robertson, Glasgow (GB)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 220 days.

(21) Appl. No.: 14/502,027

(22) Filed: Sep. 30, 2014

(65) Prior Publication Data

US 2016/0092229 A1    Mar. 31, 2016

(51) Int. Cl.
| | | |
|---|---|---|
| *G06F 9/00* | (2006.01) | |
| *G06F 9/44* | (2006.01) | |
| *G06F 9/38* | (2006.01) | |
| *G06F 9/32* | (2006.01) | |

(52) U.S. Cl.
CPC ............. *G06F 9/3806* (2013.01); *G06F 9/322* (2013.01)

(58) Field of Classification Search
None
See application file for complete search history.

(56) References Cited

U.S. PATENT DOCUMENTS

| | | | |
|---|---|---|---|
| 6,842,853 B1 * | 1/2005 | Bush | G06F 12/0253 711/E12.009 |
| 7,890,735 B2 | 2/2011 | Tran | |
| 8,886,920 B2 * | 11/2014 | Olson | 712/237 |
| 2005/0243734 A1 * | 11/2005 | Nemirovsky | G06F 9/30101 370/252 |
| 2010/0274972 A1 * | 10/2010 | Babayan | G06F 9/3842 711/125 |
| 2012/0233442 A1 | 9/2012 | Shah et al. | |

FOREIGN PATENT DOCUMENTS

| | | |
|---|---|---|
| EP | 1247168 B1 | 10/2004 |
| WO | 2013158330 A3 | 10/2013 |

* cited by examiner

*Primary Examiner* — Michael Sun

(57) ABSTRACT

A processor is configured to execute instructions of a first thread and a second thread. A first return stack corresponds to the first thread, and a second return stack to the second thread. Control circuitry pushes a return address to the first return stack in response to a branch to subroutine instruction in the first thread. If the first return stack is full and borrowing is not enabled by the borrow enable indicator, the control circuitry removes an oldest return address from the first return stack and not store the removed oldest return address in the second return stack. If the first return stack is full and borrowing is enabled by the borrow enable indicator and the second thread is not enabled, the control circuitry removes the oldest return address from the first return stack and push the removed oldest return address onto the second return stack.

20 Claims, 4 Drawing Sheets

SYSTEMS AND METHODS FOR MANAGING RETURN STACKS IN A MULTI-THREADED DATA PROCESSING SYSTEM

BACKGROUND

Field

This disclosure relates generally to data processors, and more specifically, to managing return stacks in a multi-threaded data processing system.

Related Art

Branch target buffers (BTBs) are typically used within data processing systems to improve branch performance. BTBs act as a cache of recent branches and can accelerate branches by providing a branch target address prior to execution of the branch instruction, which allows a processor to more quickly begin execution of instructions at the branch target address. In conjunction with a BTB, an associated return stack is used for storing return addresses for subroutine calls. For example, within a thread, branches to subroutines (such as branch and link instructions) and returns from subroutines (such as branch to link instructions) are also stored in the BTB. Therefore, when a new branch to subroutine is stored into the BTB or a branch to subroutine hits in the BTB, a return address corresponding to the branch to subroutine is pushed onto the return stack. When a new branch from subroutine is stored into the BTB or a branch from subroutine hits in the BTB, a pop from the stack is performed to provide the return address. This allows program execution to continue at the appropriate location. In a multi-threaded processor, each thread typically has its own private BTB and associated return stack. When sufficient space is not available in a return stack, branch performance is reduced. However, increasing the size of the return stacks for the threads increases circuit area and power, which results in increased cost. Therefore, there is a need for improved return stacks for use within a multi-threaded system which does not significantly increase area or power.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

In a multi-threaded data processing system, in order to improve branch performance for each thread, each thread has a corresponding branch target buffer (BTB) and an associated return stack. Therefore, in a multi-threaded system capable of executing N threads, N BTBs and N return stacks may be present within the system, each associated with an executing thread. When each of the multiple threads are enabled, each thread has private use of its corresponding BTB and associated return stack. However, when fewer than all threads are enabled, an enabled thread may utilize the unused return stack of other disabled threads. In this manner, the size of the return stack of the enabled thread may be effectively scaled, when possible, to allow for improved branch performance within the thread.

Figure 1:
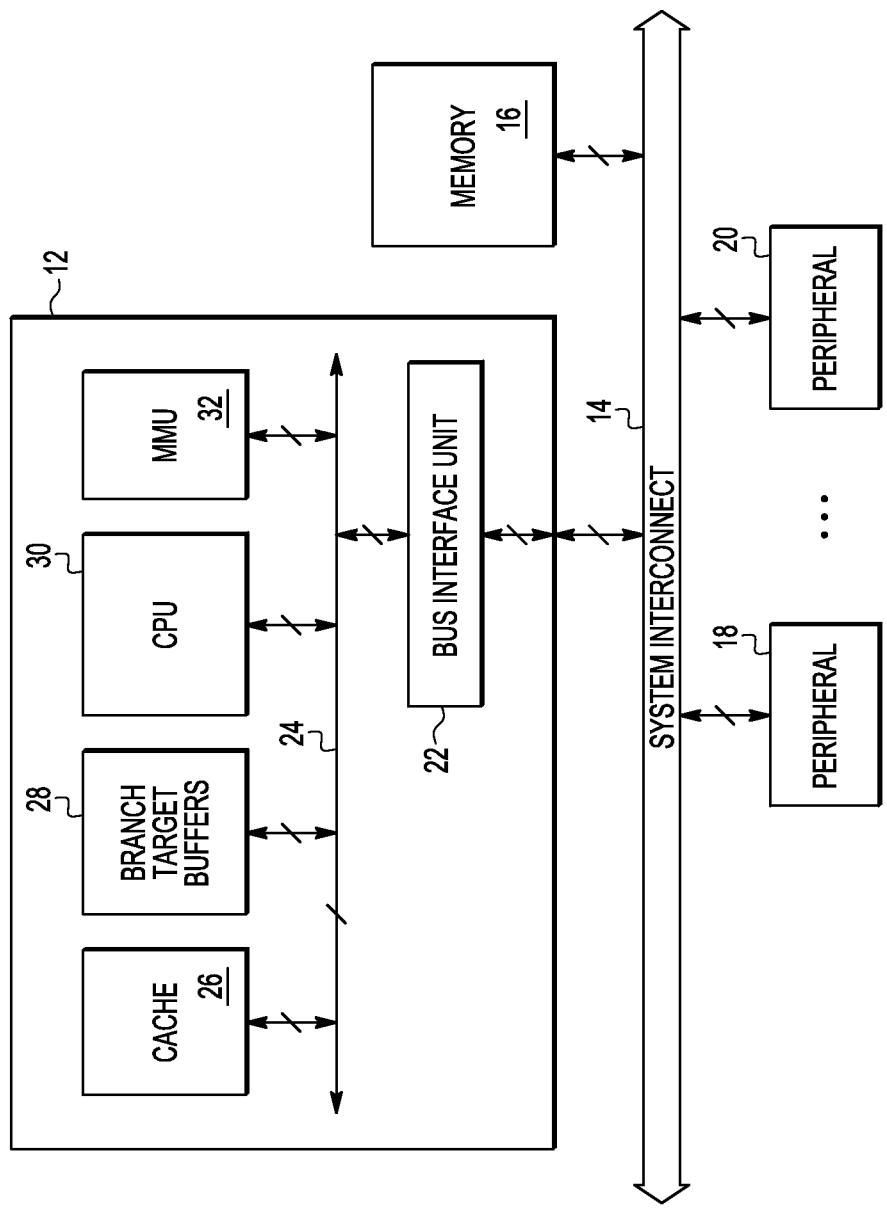
FIG. 1 illustrates, in block diagram form, a data processing system having a branch target buffer in accordance with one embodiment of the present invention.

FIG. 1 illustrates, in block diagram form, a multi-threaded data processing system 10 capable of executing multiple threads. As used herein, it will be assumed that data processing system 10 is capable of executing up to two threads, thread0 and thread1. Data processing system 10 includes a processor 12, a system interconnect 14, a memory 16 and a plurality of peripherals such as a peripheral 18, a peripheral 20 and, in some embodiments, additional peripherals as indicated by the dots in FIG. 1 separating peripheral 18 from peripheral 20. Memory 16 is a system memory that is coupled to system interconnect 14 by a bidirectional conductor that, in one form, has multiple conductors. In the illustrated form each of peripherals 18 and 20 is coupled to system interconnect 14 by bidirectional multiple conductors as is processor 12. Processor 12 includes a bus interface unit (BIU) 22 that is coupled to system interconnect 14 via a bidirectional bus having multiple conductors. BIU 22 is coupled to an internal interconnect 24 via bidirectional conductors. In one embodiment, internal interconnect 24 is a multiple-conductor communication bus. Coupled to internal interconnect 24 via respective bidirectional conductors is a cache 26, branch target buffers (BTBs) 28, a central processing unit (CPU) 30 and a memory management unit (MMU) 32. CPU 30 is a processor for implementing data processing operations. Each of cache 26, BTBs 28, CPU 30 and MMU 32 are coupled to internal interconnect 24 via a respective input/output (I/O) port or terminal.

In operation, processor 12 functions to implement a variety of data processing functions by executing a plurality of data processing instructions. Cache 26 is a temporary data store for frequently-used information that is needed by CPU 30. Information needed by CPU 30 that is not within cache 26 is stored in memory 16. MMU 32 controls accessing of information between CPU 30 and cache 26 and memory 16.

BIU 22 is only one of several interface units between processor 12 and the system interconnect 14. BIU 22 functions to coordinate the flow of information related to instruction execution including branch instruction execution by CPU 30. Control information and data resulting from the execution of a branch instruction are exchanged between CPU 30 and system interconnect 14 via BIU 22.

BTBs 28 includes multiple BTBs and their associated return stacks, one BTB and return stack for each possible thread which may be enabled within data processing system 10, and each BTB includes a plurality of entries. Each of the entries within a given BTB corresponds to branch instruction addresses associated with branch instructions that are executed within the corresponding thread by the CPU 30. Therefore, CPU 30 generates branch instruction addresses which are sent via internal interconnect 24 to BTBs 28. Each BTB within BTBs 28 contains a subset of all of the possible branch instruction addresses that may be generated by CPU 30. In response to receiving a branch instruction address from CPU 30, BTBs 28 provides a hit indicator from an appropriate BTB within BTBs 28 to CPU 30. If the hit indicator is asserted, indicating a hit occurred within BTBs 28, a branch target address is also provided from the appropriate BTB (or return stack) to CPU 30. CPU 30 may then begin instruction fetch and execution at the branch target address.

Figures 2, 3:
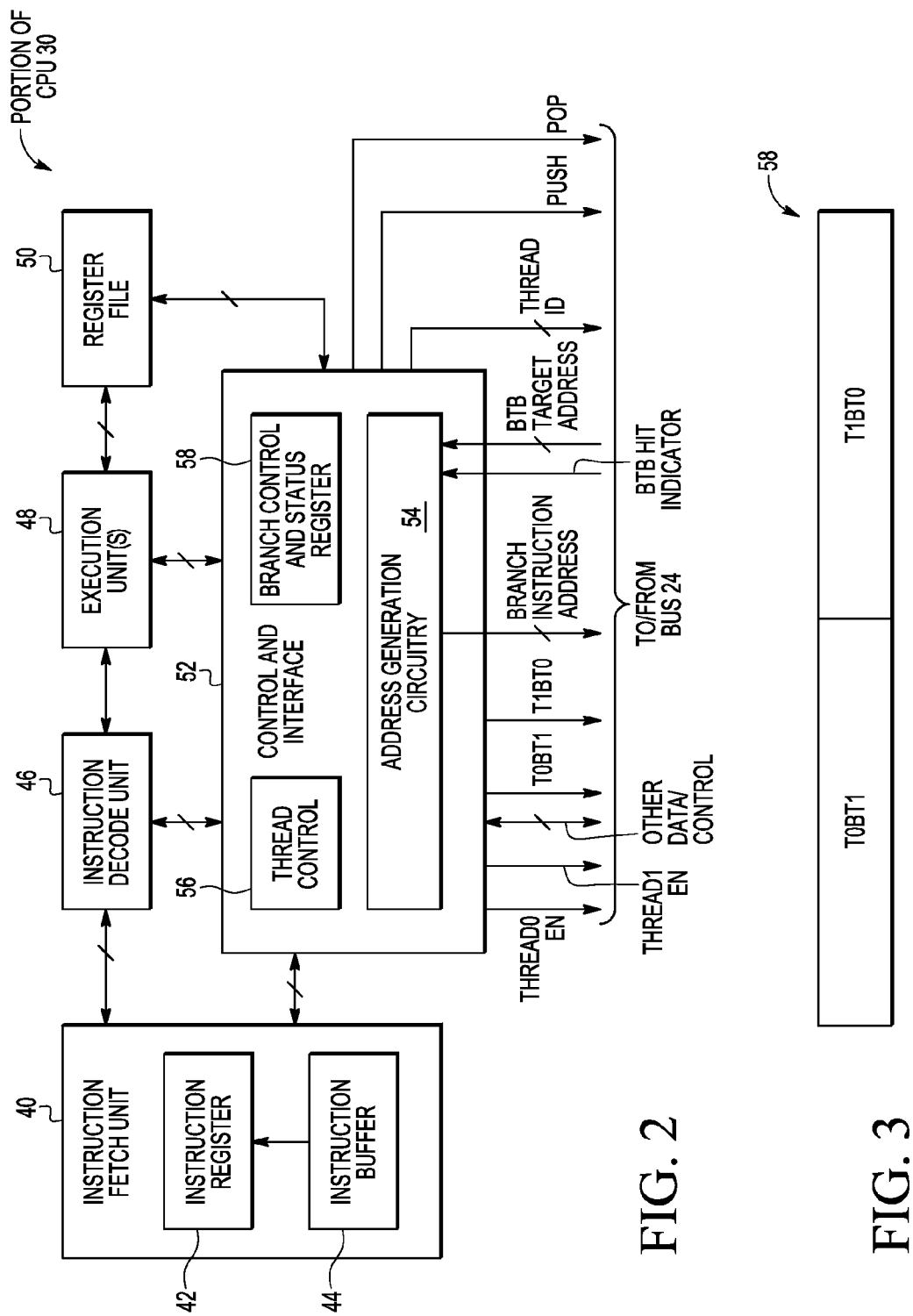
FIG. 2 illustrates, in block diagram form, a portion of a central processing unit (CPU) of the data processing system of FIG. 1 in accordance with one embodiment of the present invention.
FIG. 3 illustrates, in diagrammatic form, a branch control and status register in accordance with one embodiment of the present invention.

Illustrated in FIG. 2 is a detailed portion of CPU 30 of FIG. 1 that relates to the execution of instructions and the use of BTBs 28. An instruction fetch unit 40 is illustrated as including both an instruction buffer 44 and an instruction register 42. The instruction buffer 44 has an output that is connected to an input of instruction register 42. A multiple conductor bidirectional bus couples a first output of instruction fetch unit 40 to an input of an instruction decode unit 46 for decoding fetched instructions. An output of instruction decode unit 46 is coupled via a multiple conductor bidirectional bus to one or more execution unit(s) 48. The one or more execution unit(s) 48 is coupled to a register file 50 via a multiple conductor bidirectional bus. Additionally, instruction decode unit 46, one or more execution unit(s) 48, and register file 50 is coupled via separate bidirectional buses to respective input/output terminals of a control and interface unit 52 that interfaces to and from internal interconnect 24.

The control and interface unit 52 has address generation circuitry 54 having a first input for receiving a BTB Hit Indicator signal via a multiple conductor bus from the BTBs 28 via internal interconnect 24. Address generation circuitry 54 also has a second input for receiving a BTB Target Address via a multiple conductor bus from BTBs 28 via internal interconnect 24. Address generation circuitry 54 has a multiple conductor output for providing a branch instruction address to BTBs 28 via internal interconnect 24.

Control and interface circuitry 52 includes a thread control unit 56 which controls the enabling and disabling of thread0 and thread1. Thread control unit 56 provides a thread0 enable signal (thread0 en), which, when asserted, indicates that thread0 is enabled, to BTBs 28 by way of internal interconnect 24. Thread control unit 56 provides a thread1 enable (thread1 en) signal, which, when asserted, indicates that thread1 is enabled, to BTBs 28 by way of internal interconnect 24. Thread control 56 selects an enabled thread for execution by CPU 30. If a thread is disabled, it cannot be selected for execution. Thread control 56 controls the execution of the enabled threads, such as when to start and stop execution of a thread. For example, thread control 56 may implement a round robin approach in which each thread is given a predetermined amount of time for execution. Alternatively, other thread control schemes may be used. Control and interface circuitry 52 also provides a thread ID to BTBs 28 by way of internal interconnect 24 which provides an indication of which thread is currently executing. Control and interface circuitry 52 provides a push indicator to BTBs 28 by way of internal interconnect 24 which provides an indication of whether a push is to be performed onto a return stack to store a return address for a branch to subroutine instruction. Control and interface circuitry 52 also provides a pop indicator to BTBs 28 by way of internal interconnect 24 which provides an indication of whether a pop is to be performed from the return stack to provide a return address as the branch target address for a return from subroutine instruction.

Control and interface circuitry 52 also includes a branch control and status register 58 which may be used to store control and status information for BTBs 28 such as control bits T0BT1 and T0BT2. These control bits may be provided to BTBs 28 by way of internal interconnect 24. Note that branch control and status register 58 will be described in further detail in reference to FIG. 3 below. Other data and control signals can be communicated via single or multiple conductors between control and interface unit 52 and internal interconnect 24 for implementing data processing instruction execution, as required.

In the illustrated form of this portion of CPU 30, control and interface unit 52 controls instruction fetch unit 40 to selectively identify and implement the fetching of instructions including the fetching of groups of instructions. Instruction decode unit 46 performs instruction decoding for one or more execution unit(s) 48. Register file 50 is used to support one or more execution unit(s) 48. Within control and interface unit 52 is address generation circuitry 54. Address generation circuitry 54 sends out a branch instruction address (BIA) to BTBs 28. In response to the branch instruction address, a BTB hit indicator is provided to CPU 30, and, if asserted, a BTB target address may also be provided to CPU 30. The BTB target address is used by CPU 30 to obtain an operand at the target address from either cache 26 or from memory 16 if the address is not present and valid within cache 26.

FIG. 3 illustrates, in diagrammatic form, branch control and status register 58 in accordance with one embodiment of the present invention. Register 58 is configured to store borrow enable control bits. In the illustrated embodiment, these borrow enable control bits include a T0BT1 control bit which, when asserted (e.g. is a logic level 1), indicates that thread0 may borrow thread1's return stack when thread 1 is disabled and a T1BT0 control bit which, when asserted (e.g. is a logic level 1), indicates that thread1 may borrow thread0's return stack when thread0 is disabled. These control bits may be provided to BTBs 28. In one embodiment, branch control and status register 58 includes a borrow enable control bit corresponding to each return stack in BTBs 28 which indicates whether or not borrowing is enabled for the corresponding return stack. In this embodiment, the borrow enable control bit for a return stack may indicate whether or not its entries can be borrowed by another thread. Alternatively, the borrow enable control bit for a return stack may indicate whether its entries can be borrowed by one or more particular threads. In this case, register 58 may store multiple borrow enable control bits for each return stack to indicate whether borrowing is enabled from that return stack by a particular thread.

Figure 4:
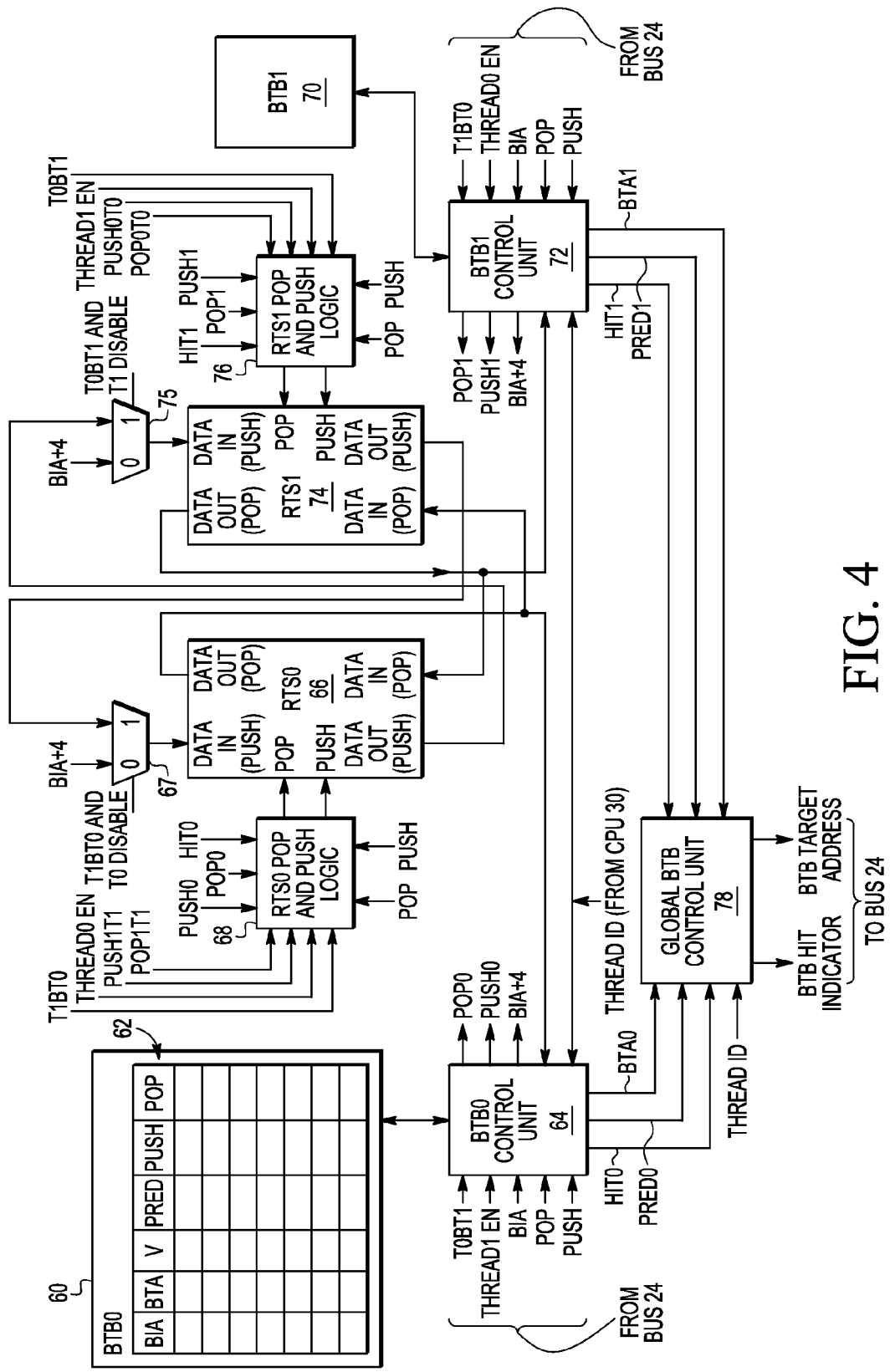
FIG. 4 illustrates in block diagram form a portion of the branch target buffers of FIG. 1 in accordance with one embodiment of the present invention.

FIG. 4 illustrates, in block diagram form, a detailed portion of BTBs 28 of FIG. 1. In the illustrated embodiment, BTBs 28 includes two BTBS, BTB0 60 and BTB1 70. BTB0 60 has an associated return stack RTS0 66, and BTB1 has an associated return stack RTS1 74. BTB0 and RTS0 correspond to the private BTB and RTS of thread0 and BTB1 and RTS1 correspond to the private BTB and RTS of thread1. However, as will be described below, selective sharing of the RTSs between threads may allow for improved performance. BTBs 28 also includes RTS0 pop and push logic 68 which corresponds to RTS0, BTB0 control unit 64 which corresponds to BTB0 and RTS0, RTS1 pop and push logic 76 which corresponds to RTS1, a BTB1 control unit 72 which corresponds to BTB1 and RTS1, and a global BTB control unit 78 which manages information from BTB0 control unit 64 and BTB1 control unit 72.

BTB0 is bidirectionally coupled to BTB0 control unit 64. BTB0 control unit 64 also receives T0BT1, thread1 en, thread ID, BIA, pop, and push from CPU 30, provides pop0 and push0 to RTS0 pop and push logic 68, and BIA+4 (corresponding to the push address) to MUX 67, and provides hit0, pred0, and BTA0 to global BTB control unit 78. RTS0 pop and push logic 68 also receives pop and push from CPU 30, and receives hit0, pop0 and push0 from BTB0 control unit 64. RTS0 pop and push logic 68 also receives T1BT0, thread0 en, pop1T1, and push1T1. RTS0 66 has a pop input coupled to receive pop commands from RTS0 pop and push logic 68, and a push input coupled to receive push commands from RTS0 pop and push logic 68. RTS0 66 has a data out output for pop commands, labeled as data out (pop), and a data out output for push commands, labeled as data out (push). RTS0 66 has a data in input for push commands, labeled as data in (push), and a data in input for pop commands, labeled as data in (pop). The data out (pop) output is coupled to provide pop data to BTB0 control unit 64. Data out (push) output is coupled to provide push data to RTS1 74. Data in (push) input is coupled to an output of a multiplexer (MUX) 67 which receives BIA+4 from BTB0 control unit 64 at a first data input and is coupled to receive push data from RTS1 74 at a second data input, and "T1BT0 AND T0 disabled" at a control input.

BTB1 is bidirectionally coupled to BTB1 control unit 72. BTB1 control unit 72 also receives T1BT0, thread0 en, thread ID, BIA, pop, and push from CPU 30, provides pop1 and push1 to RTS1 pop and push logic 76, and BIA+4 (corresponding to the push address) to MUX 75, and provides hit1, pred1, and BTA1 to global BTB control unit 78. Global BTB control unit 78 provides BTB hit indicator and BTB target address to CPU 30. RST1 pop and push logic 76 also receives pop and push from CPU 30, and receives hit1, pop1, and push1 from BTB1 control unit 72. RTS1 pop and push logic 76 also receives T0BT1, thread1 en, pop0T0, and push0T0. RTS1 74 has a pop input coupled to receive pop commands from RTS1 pop and push logic 76, and a push input coupled to receive push commands from RTS1 pop and push logic 76. RTS1 74 has a data out output for pop commands, labeled as data out (pop), and a data out output for push commands, labeled as data out (push). RTS0 74 has a data in input for push commands, labeled as data in (push), and a data in input for pop commands, labeled as data in (pop). The data out (pop) output of RTS1 74 is coupled to provide pop data to BTB1 control unit 72. Data out (push) output is coupled to provide push data to the second data input of MUX 67. Data in (push) input is coupled to an output of a multiplexer (MUX) 75 which receives BIA+4 from BTB1 control unit 72 at a first data input and is coupled to receive push data from RTS0 66 at a second data input, and "T0BT1 AND T1 disabled" at a control input.

BTB0 includes a plurality of entries, such as entry 62, in which each entry includes a branch instruction address (BIA), a branch target address (BTA), a valid bit (V), a prediction value (PRED), a push bit, and a pop bit. Similarly, BTB1 also includes a plurality of entries similar to entry 62. One type of branch executable by CPU 30 is a branch and link instruction (BL). This instruction (which may also be referred to as a branch to subroutine instruction) is used to change instruction flow to execute a subroutine located at an address specified by the BL instruction. The address may be specified by the use of a label to indicate the location of the subroutine. Also, upon executing a BL instruction, a return address (which may be referred to as a push address) is pushed onto the return stack. This return address corresponds to the instruction address (BIA) of the BL instruction plus an offset. For example, if each instruction is 32 bits, then the return address corresponds to BIA+4 since the program counter (PC) needs to be incremented by 4 to fetch an instruction subsequent to the BL instruction. When a BL instruction is stored in an entry of BTB0 or BTB1, the instruction address of the BL instruction is stored as the BIA, the target address is stored as the BTA, the valid bit is asserted, and the push bit of the entry is asserted to indicate that a return address was pushed onto the associated return stack. Note that a BL instruction may be an unconditional or conditional branch. In the case of a conditional branch, the branch to subroutine is only performed if the conditions of the conditional BL instruction are satisfied. Therefore, a corresponding prediction value may be stored in the entry allocated for a BL instruction. In the case of an unconditional branch, the prediction value indicates the branch is predicted taken.

Another type of branch instruction executable by CPU 30 is a branch to link instruction (BLR). This instruction (which may also be referred to as a return from subroutine instruction) is used at the end of a subroutine in order to return program execution flow back to the instruction subsequent to the subroutine call (the BL instruction which called the particular subroutine). Upon execution of a BLR instruction, the return stack is popped in order to obtain the appropriate return address. This return address is provided to the link register of CPU30 such that the PC counter can be updated with the appropriate value to return program flow to the instruction following the subroutine call. Since a subroutine is able to call another subroutine (i.e. a nested subroutine), the use of the return stack (which is a last in first out structure) ensures that each return address is popped and taken in the appropriate order when returning from nested subroutines. When a BLR instruction is stored in an entry of BTB0 or BTB1, the instruction address of the BLR instruction is stored as the BIA, the valid bit is asserted, and the pop bit of the entry is asserted. In this case, no value is saved as the BTA. Instead, upon a hit of this entry in the BTB, a pop of the return stack is performed in which the popped data is provided as the BTA back to CPU 30. Also, a BLR is typically an unconditional branch, therefore, the prediction value for a BLR can indicate that the branch is predicted taken.

In operation, pops and pushes to each RTS are performed by asserting the pop and push inputs, respectively, of the RTS. In order to perform a pop from RTS0 66, the pop input of RTS0 is asserted, and the popped data is provided at the data out (pop) output. The popped data is popped from the top of the stack, thus corresponding to the newest data (i.e. the newest entry) of the return stack. In order to perform a push to RTS0 66, the push input of RTS0 is asserted, and the data to be pushed is provided to the data in (push) input of RTS0 66. The pushed data is pushed onto the top of the stack and thus becomes the newest data (i.e. the newest entry) of the return stack. In order to perform a pop from RTS1 74, the pop input of RTS1 is asserted, and the popped data is provided at the data out (pop) output. In order to perform a push to RTS1 74, the push input of RTS1 is asserted, and the data to be pushed is provided to the data in (push) input of RTS1. The pop and push inputs of RTS0 are asserted, as needed, by RTS0 pop and push logic 68 based on pop and push inputs from CPU 30, hit0, pop0 and push0 from BTB0 control unit 64, and T1BT0, thread0 en, pop1T1, and push1T1. T1BT0 and thread0 en can be received from CPU 30 or may be received from BTB1 control unit 72. Pop1T1 and Push1T1 are provided by RTS1 pop and push logic 76. The pop and push inputs of RTS1 are asserted, as needed, by RTS1 pop and push logic 76 based on pop and push inputs from CPU 30, hit1, pop1, and push1 from BTB1 control unit 72, and T0BT1, thread1 en, pop0T0, and push0T0. T0BT1 and thread1 en can be received from CPU 30 or may be received from BTB0 control unit 64. Pop0T0 and Push0T0 are provided by RTS0 pop and push logic 68. Details of pop and push logic 68 and 76 in accordance with one embodiment are provided in FIGS. 5 and 6.

Still referring to FIG. 4, when no sharing is enabled (such as when both thread0 and thread1 are enabled), each of RTS0 and RTS1 operate as a private RTS for the corresponding thread. That is, each RTS operates independently of other RTSs. Note that without sharing, MUX 67 selects BIA+4 to be provided to the data in (push) input of RTS0 and MUX 75 selects BIA+4 to be provided to the data in (push) input of RTS1. In this case, if RTS0 is full and a push is performed, the oldest entry is pushed out of RTS0 and lost. Similarly, if RTS1 is full and a push is performed, the oldest entry is pushed out of RTS1 and lost.

For each BIA submitted by CPU 30 to BTBs 28, each of the BTB control units perform a lookup in the corresponding BTB and provides a hit signal (hit0 or hit1). In the case of not sharing, branches from thread0 are stored only into BTB0 60 and branches from thread1 are stored only into BTB1 70. If a BIA misses in the BTB, the corresponding hit signal is negated. When those branches from thread0 which missed in BTB0 and are resolved by CPU 30 as taken, they are allocated (e.g. stored) into BTB0. In doing so, the BTA (if not a branch from subroutine) and a prediction as to whether the branch is taken or not-taken is stored in an entry corresponding to the BIA of the branch instruction which missed. Also, in the case of a BL instruction to be allocated into BTB0, CPU 30 asserts the push signal provided to BTB0 control unit 64 so that the push bit of the allocated entry is set, and the calculated return address (e.g. BIA+4) is pushed onto RTS0. In the case of a BLR instruction to be allocated into BTB0, CPU 30 asserts the pop signal provided to BTB0 control unit 64 so that the pop bit of the allocated entry is set and no value is saved as the BTA. Also, RTS0 is updated by performing a pop. Similarly, when those branches from thread1 which missed in BTB1 and are resolved by CPU 30 as taken, they are allocated (e.g. stored) into BTB1 along with the corresponding BTA (if not a branch from subroutine) and a prediction as to whether the branch is taken or not-taken. Also, in the case of a BL instruction to be allocated into BTB1, CPU 30 asserts the push signal provided to BTB1 control unit 72 so that the push bit of the allocated entry is set and the calculated return address (e.g. BIA+4) is pushed onto RTS1. In the case of a BLR instruction to be allocated into BTB0, CPU 30 asserts the pop signal provided to BTB1 control unit 72 so that the pop bit of the entry is set, no value is saved as the BTA, and RTS1 is updated by performing a pop.

In one embodiment, note that an entry in a BTB is allocated for each branch instruction which missed in its corresponding BTB and is later resolved as taken. In alternate embodiments, an entry in a BTB may be allocated for each branch instruction which misses in the BTB, regardless of whether it is resolved as taken or not taken.

For each BIA submitted by CPU 30 to BTBs 28, when a BTB control unit determines that a hit occurs, the BTB control unit asserts the corresponding hit signal (hit0 or hit1), and provides a corresponding prediction signal (pred0 or pred1) and a corresponding BTA (BTA0 or BTA1) to global BTB control unit 78. For example, if BTB0 control unit 64 determines that the received BIA matches an entry in BTB0, BTB0 control unit 64 asserts hit0 and provides pred0 and BTA0 to global BTB control unit 78. If neither the pop nor the push bit of the matching entry (i.e. hit entry) is asserted, pred0 and BTA0 of the matching entry of BTB0 is provided to global BTB control unit 78. Also, BTB0 control unit 64 negates pop0 and push0. If the push bit of the matching entry is asserted, push0 is asserted, BTA0 of the matching entry is provided as BTA0, and BIA+4 is pushed onto RTS0. If RTS0 is full and sharing is not enabled, the oldest entry is lost. If the pop bit of the matching entry is asserted, pop0 is asserted, RTS0 is popped, and the popped data value is provided as BTA0. The previous oldest entry in RTS0 is maintained as the oldest entry. That is, without sharing enabled, popping a value from RTS0 does not affect the oldest entry. Similarly, if BTB1 control unit 72 determines that the received BIA matches an entry in BTB1, BTB1 control unit 72 asserts hit1 and provides pred1 and BTA1 to global BTB control unit 78. If neither the pop nor the push bit of the matching entry is asserted, then pop1 and push 1 are negated and pred1 and BTA1 of the matching entry of BTB1 are provided to global BTB control unit 78. If the push bit of the matching entry is asserted, push1 is asserted, BTA1 of the matching entry is provided as BTA1, and BIA+4 is pushed onto RTS1. If RTS1 is full and sharing is not enabled, the oldest entry is lost. If the pop bit of the matching entry is asserted, pop1 is asserted, RTS1 is popped, and the popped data value is provided as BTA1. The previous oldest entry in RTS1 is maintained as the oldest entry. That is, without sharing enabled, popping a value from RTS1 does not affect the oldest entry.

Continuing with the above example, if hit0 is asserted and pred0 indicates the branch is predicted taken, global BTB control unit 78 asserts the BTB hit indicator and provides BTA0 as the BTB target address. If hit1 is asserted and pred1 indicates the branch is predicted taken, global BTB control unit 78 asserts the BTB hit indicator and provides BTA1 as the BTB target address. Note that if the corresponding prediction signal for an asserted hit signal from BTB0 or BTB1 indicates the branch is predicted as not taken, global BTB control unit 78 does not assert the BTB hit indicator and does not provide a BTB target address since a not-taken branch indicates the next instructions is fetched from the next sequential address. Also, if both BTB0 and BTB1 result in a hit such that both hit0 and hit1 are asserted, global BTB control unit 78 uses the thread ID to determine which hit signal and prediction to use to provide the BTB hit indicator and BTB target address to CPU 30. That is, if the thread ID indicates thread 0, global BTB control unit 78 asserts the BTB hit indicator if pred0 indicates a taken prediction and provides BTA0 as the BTB target address. In another embodiment, global BTB control unit 78 may provide multiple hit indicators and target addresses corresponding to each BTB. In this case, BTBs 28 may allow BTB lookups from all threads (e.g. both thread0 and thread1) at the same time.

In one embodiment, the prediction value stored in each BTB entry may be a two-bit counter value which is incremented to a higher value to indicate a stronger taken prediction or decremented to a lower value to indicator a weaker taken prediction or to indicate a not-taken prediction. Any other implementation of the branch predictor may be used. In an alternate embodiment, no prediction value may be present where, for example, branches which hit in a BTB may always be predicted taken.

In the case in which one of thread0 or thread1 is not enabled, its RTS can be selectively shared by the other thread. The T0BT1 and T1BT0 control bits may be used to indicate when a thread may borrow additional RTS entries from another thread's private RTS. In one embodiment, a thread may borrow entries from another thread's RTS only if borrowing is enabled from the other thread's RTS (such as by the borrow enable control bits) and the other thread is not enabled (i.e. is disabled). For example, if thread0 is enabled, T0BT1 is asserted (indicating that thread 0 is enabled to borrow from return stack of thread1, RTS1), and thread1 is not enabled (thread1 en is negated), then RTS0 is expanded with RTS1. In this case, "T0BT1 AND NOT thread1 en" is true such that MUX 75 selects the second data input to provide to the data in (push) input of RTS1. In the case of sharing return stacks, when RTS0 is full and another return address is pushed onto RTS0, the oldest entry, rather than being lost, is provided at the data out (push) output of RTS0. The oldest entry of RTS0 is routed to the data in (push) input of RTS1 via MUX 75 and is pushed onto RTS1 (by asserting the push input of RTS1). In this manner, RTS0 has been incremented by one entry. As return addresses continue to be pushed onto RTS0, the oldest entry will be provided to the data in (push) of RTS1 to be pushed onto RTS1. Therefore, the maximum capacity of RTS0 is expanded to RTS0+RTS1.

When the push data has overflowed into RTS1 such that the older entries are stored in RTS1 (i.e. when RTS1 is not empty), a pop from RTS0 results in obtaining a popped return address from RTS0 to provide as BTA0 and moves up the entries in RTS1. In doing so, the newest entry of RTS1 is popped (by asserting the pop input of RTS1). This popped return address is output at the data out (pop) output of RTS1 and provided to the data in (pop) input of RTS0 so that it may be stored as the oldest entry in RTS0. Note that similar logic applies in the case in which thread1 is enabled to borrow entries from RTS0.

For RTS0 and RTS1, when data is received at its data in (pop) input, the contents of the stack are shifted up such that the data at the data in (pop) input becomes the oldest entry within the stack. This shift may be performed by the pop and push logic or other control logic corresponding to the return stacks. Note that data received at the data in (pop) input is not treated the same as data received at the data in (push) input. Data at the data in (push) input, when the push input is asserted, is pushed onto the top of the stack such that it is the newest entry of the stack. Also, in the case of data provided at the data out (push) output, the data is the oldest entry of the stack. In contrast, data provided at the data out (pop) output corresponds to the newest entry of the stack.

Figure 5:
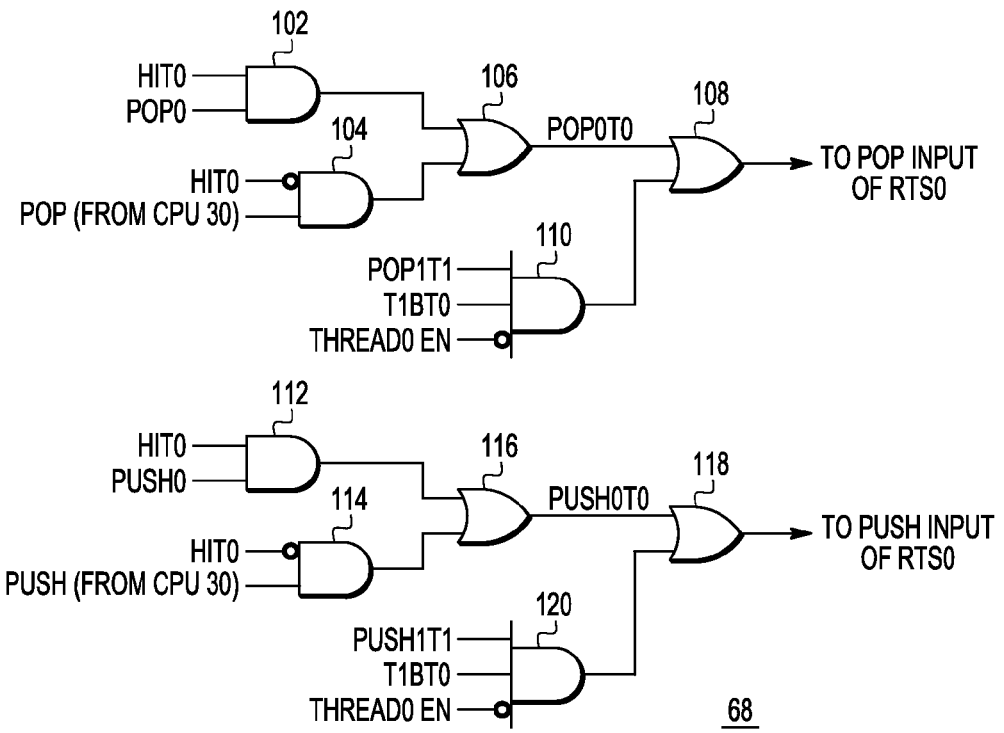
FIGS. 5 and 6 illustrate, in logic diagram form, push and pop logic circuits of FIG. 4, in accordance with one embodiment of the present invention.
Figure 6:
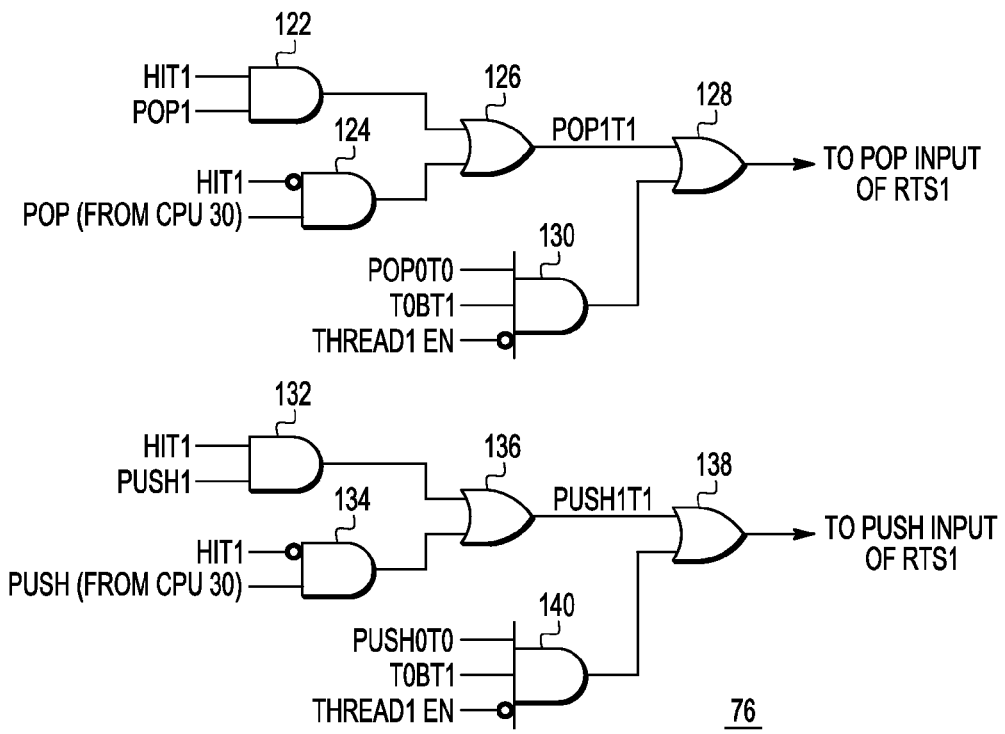

FIGS. 5 and 6 illustrate, in logic diagram form, example logic which may be used to implement RTS0 pop and push logic 68 and RTS1 pop and push logic 76, respectively. FIG. 5 illustrates an implementation of pop and push logic 68, in accordance with one embodiment of the present invention. FIG. 5 includes AND gates 102, 104, 110, 112, 114, and 120, and OR gates 106, 108, 116, and 118. AND gate 102 has a first input coupled to receive hit0 and a second input coupled to receive pop0. AND gate 104 has a first input, implemented as an inverting input, coupled to receive hit0 and a second input coupled to receive the pop signal from CPU 30. OR gate 106 has a first input coupled to an output of AND gate 102 and a second input coupled to an output of AND gate 104. OR gate 106 provides an output, pop0T0 to a first input of OR gate 108. AND gate 110 has a first input coupled to receive pop1T1, a second input coupled to receive T1BT0, and a third input, implemented as an inverting input, coupled to receive thread0 en. OR gate 108 has a second input coupled to the output of AND gate 110 and an output coupled to the pop input of RTS0.

The output of OR gate 106, pop0T0 corresponds to the nonshared case in which a pop is to be performed for RTS0. As was described above, when a hit occurs and the hit entry has its pop bit asserted, BTB0 control unit 64 asserts hit0 and pop0 and the output of AND gate 102 is asserted. When a miss occurs (in which BTB0 control unit 64 negates hit0) and CPU 30 asserts the pop signal upon resolving a BLR instruction, the output of AND gate 104 is asserted. When either of these conditions occurs, pop0T0 is asserted. In this case, the pop input of RTS0 is asserted by the output of OR gate 108. Another situation in which the pop input of RTS0 should be asserted corresponds to the case in which a pop of RTS1 is necessitated, thread0 is disabled, thread1 is enabled, and T1BT0 is asserted such that thread1 can use entries of RTS0. Therefore, if pop1T1 is asserted (indicating a pop of RTS1 is occurring), T1BT0 is asserted, and thread0 is disabled, the output of AND gate 110 is asserted. Therefore, the pop input of RTS0 is asserted if either pop0T0 is asserted or if the output of AND gate 110 is asserted (indicating that an entry of RTS0 is to be borrowed by RTS1 for the pop).

Still referring to FIG. 5, AND gate 112 has a first input coupled to receive hit0, and second input coupled to receive push0. AND gate 114 has a first input, implemented as an inverting input, coupled to receive hit0 and a second input coupled to receive the push signal from CPU 30. OR gate 116 has a first input coupled to an output of AND gate 112 and a second input coupled to an output of AND gate 114. OR gate 116 provides an output, push0T0 to a first input of OR gate 118. AND gate 120 has a first input coupled to receive push1T1, a second input coupled to receive T1BT0, and a third input, implemented as an inverting input, coupled to receive thread0 en. OR gate 118 has a second input coupled to the output of AND gate 120 and an output coupled to the push input of RTS0.

The output of OR gate 116, push0T0 corresponds to the nonshared case in which a push is to be performed for RTS0. As was described above, when a hit occurs and the hit entry has its push bit asserted, BTB0 control unit 64 asserts hit0 and push0 and the output of AND gate 112 is asserted. When a miss occurs (in which BTB0 control unit 64 negates hit0) and CPU 30 asserts the push signal upon resolving a BL instruction, the output of AND gate 114 is asserted. When either of these conditions occurs, push0T0 is asserted. In this case, the push input of RTS0 is asserted by the output of OR gate 118. Another situation in which the push input of RTS0 should be asserted corresponds to the case in which a push of RTS1 is necessitated, thread0 is disabled, thread1 is enabled, and T1BT0 is asserted such that thread1 can use entries of RTS0. Therefore, if push1T1 is asserted (indicating a push of RTS1 is occurring), T1BT0 is asserted, and thread0 is disabled, the output of AND gate 120 is asserted. Therefore, the push input of RTS0 is asserted if either push0T0 is asserted or if the output of AND gate 120 is asserted (indicating that an entry of RTS0 is to be borrowed by RTS1 for the push).

FIG. 6 illustrates an implementation of pop and push logic 76, in accordance with one embodiment of the present invention. FIG. 6 includes AND gates 122, 124, 130, 132, 134, and 140, and OR gates 126, 128, 136, and 138. Connectivity and operation of FIG. 6 is analogous to the description of FIG. 5, but from the perspective of RTS1 rather than RTS0. Therefore, pop1T1 at the output of OR gate 126 corresponds to the nonshared case in which a pop is to be performed from RTS1. When a hit occurs and the hit entry has its pop bit asserted, BTB1 control unit 72 asserts hit1 and pop1 and the output of AND gate 122 is asserted. When a miss occurs (in which BTB1 control unit 72 negates hit1) and CPU 30 asserts the pop signal upon resolving a BLR instruction, the output of AND gate 124 is asserted. When either of these conditions occurs, pop1T1 is asserted. In this case, the pop input of RTS1 is asserted by the output of OR gate 128. Another situation in which the pop input of RTS1 should be asserted corresponds to the case in which a pop of RTS0 is necessitated, thread1 is disabled, thread0 is enabled, and T0BT1 is asserted such that thread0 can use entries of RTS1. Therefore, if pop0T0 is asserted (indicating a pop of RTS0 is occurring), T0BT1 is asserted, and thread1 is disabled, the output of AND gate 130 is asserted. Therefore, the pop input of RTS1 is asserted if either pop1T1 is asserted or if the output of AND gate 130 is asserted (indicating that an entry of RTS1 is to be borrowed by RTS0 for the pop).

Still referring to FIG. 6, the push1T1 at the output of OR gate 136 corresponds to the nonshared case in which a push is to be performed from RTS1. When a hit occurs and the hit entry has its push bit asserted, BTB1 control unit 72 asserts hit1 and push1 and the output of AND gate 132 is asserted. When a miss occurs (in which BTB1 control unit 72 negates hit1) and CPU 30 asserts the push signal upon resolving a BL instruction, the output of AND gate 134 is asserted. When either of these conditions occurs, push1T1 is asserted. In this case, the push input of RTS1 is asserted by the output of OR gate 138. Another situation in which the push input of RTS1 should be asserted corresponds to the case in which a push of RTS0 is necessitated, thread1 is disabled, thread0 is enabled, and T0BT1 is asserted such that thread0 can use entries of RTS1. Therefore, if push0T0 is asserted (indicating a push of RTS0 is occurring), T0BT1 is asserted, and thread1 is disabled, the output of AND gate 140 is asserted. Therefore, the push input of RTS1 is asserted if either push1T1 is asserted or if the output of AND gate 140 is asserted (indicating that an entry of RTS1 is to be borrowed by RTS0 for the push).

By now it should be appreciated that there has been provided a multi-threaded data processing system which includes private RTSs for use by each thread in which a thread may selectively borrow entries from the RTS of another thread in order to improve thread performance. In one embodiment, a thread is able to borrow entries from the RTS of another thread if the other thread is disabled and borrowing from the other thread's RTS is enabled. While the above description has been provided with respect to two threads, data processing system 10 may be capable of executing any number of threads, in which BTBs 28 would include more than 2 BTBs and associated RTSs, one corresponding to each possible thread. The borrow enable control bits may be used to indicate whether borrowing is allowed, under the appropriate conditions, from a thread's private RTS.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of data processing system 10 are circuitry located on a single integrated circuit or within a same device. Alternatively, data processing system 10 may include any number of separate integrated circuits or separate devices interconnected with each other. For example, memory 16 may be located on a same integrated circuit as processor 12 or on a separate integrated circuit or located within another peripheral or slave discretely separate from other elements of data processing system 10. Peripherals 18 and 20 may also be located on separate integrated circuits or devices. Also for example, data processing system 10 or portions thereof may be soft or code representations of physical circuitry or of logical representations convertible into physical circuitry. As such, data processing system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the number and configuration of the borrow enable control bits within control and status register 58 may be different dependent upon the number of threads capable of being executed by data processing system 10. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

In one embodiment, a data processing system includes a processor configured to execute processor instructions of a first thread and processor instructions of a second thread; a first return stack corresponding to the first thread; a second return stack corresponding to the second thread; and storage circuitry configured to store a borrow enable indicator corresponding to the second return stack which indicates whether borrowing entries from the second return stack is enabled; and control circuitry configured to push a return address to the first return stack in response to a branch to subroutine instruction in the first thread, wherein: if the first return stack is full and borrowing is not enabled by the borrow enable indicator, the control circuitry is configured to remove an oldest return address from the first return stack and not store the removed oldest return address in the second return stack, and if the first return stack is full and borrowing is enabled by the borrow enable indicator and the second thread is not enabled, the control circuitry is configured to remove the oldest return address from the first return stack and push the removed oldest return address onto the second return stack. In one aspect, the control circuitry is configured to pop a return address from the first return stack in response to a branch from subroutine instruction in the first thread, wherein if the second return stack is not empty and borrowing is enabled by the borrow enable indicator and the second thread is not enabled, the control circuitry is configured to pop a return address from the second return stack and store the return address popped from the second return stack in the first return stack as the oldest return address of the first stack. In a further aspect, if borrowing is not enabled by the borrow enable indicator when the pop from the first return stack is performed, the control circuitry is configured to maintain an oldest return address of the first return stack as the oldest return address of the first return stack. In another further aspect of the one aspect, the control circuitry provides the popped return address to the processor as a branch target address of the branch from subroutine instruction. In another aspect of the above embodiment, the return address pushed to the first return stack in response to the branch to subroutine instruction corresponds to an instruction address of a subsequent instruction which immediately follows the branch instruction. In another aspect of the above embodiment, the data processing system further includes a first branch target buffer (BTB) corresponding to the first thread, the first branch target buffer having a plurality of entries, each entry comprising a branch instruction address field, a branch target address field, a pop field, and a push field; a second branch target buffer (BTB) corresponding to the second thread, the second branch target buffer having a plurality of entries each entry comprising a branch instruction address field, a branch target address field, a pop field, and a push field; first BTB control circuitry coupled to the first BTB and the first return stack; and second BTB control circuitry coupled to the second BTB and the second return stack. In a further aspect, the first BTB control circuitry is configured to determine whether a branch instruction address of the branch to subroutine instruction hits or misses in the first BTB, and when the branch instruction address hits in the first BTB, the first BTB control circuitry is configured to provide a hit signal and a push signal to the control circuitry, wherein the control circuitry is configured to perform the push of the return address in response to the hit signal and the push signal. In yet a further aspect, when the branch instruction address misses in the first BTB, the first BTB control circuitry allocates an entry in the first BTB for the branch to subroutine instruction, wherein a target address of the branch to subroutine instruction is stored in the branch target address field of the allocated entry and the push field of the allocated entry is asserted. In another further aspect, when the branch instruction addresses misses in the first BTB, the processor is configured to resolve the branch to subroutine instruction and provide a processor push signal to the control circuitry in response thereto, wherein the first BTB control circuitry is configured to perform the push of the return address in response to the hit signal and the processor push signal. In another aspect, the control circuitry is configured to pop a return address from the first return stack in response to a branch from subroutine instruction in the first thread, wherein: if the second return stack is not empty and borrowing is enabled by the borrow enable indicator and the second thread is not enabled, the control circuitry is configured to pop a return address from the second return stack and store the return address popped from the second return stack in the first return stack as the oldest return address of the first stack. In a further aspect, the first BTB control circuitry is configured to determine whether a branch instruction address of the branch from subroutine instruction hits or misses in the first BTB, and when the branch instruction address hits in the first BTB, the first BTB control circuitry is configured to provide a hit signal and a pop signal to the control circuitry, wherein the control circuitry is configured to perform the pop of the return address in response to the hit signal and the push signal. In another further aspect, when the branch instruction address misses in the first BTB, the first BTB control circuitry allocates an entry in the first BTB for the branch from subroutine instruction, wherein a target address is not stored in the branch target address field of the allocated entry and the pop field of the allocated entry is asserted. In yet another further aspect, when the branch instruction addresses misses in the first BTB, the processor is configured to resolve the branch from subroutine instruction and provide a processor pop signal to the control circuitry in response thereto, wherein the first BTB control circuitry is configured to perform the pop of the return address in response to the hit signal and the processor pop signal. In another aspect of the above embodiment, the borrow enable indicator indicates whether borrowing is enabled for the first thread from the second return stack. In a further aspect, the storage circuitry is further configured to store a second borrow enable indicator corresponding to the first return stack which indicates whether borrowing is enabled for the second thread from the first return stack.

In another embodiment, in a data processing system configured to execute processor instructions of a first thread and processor instructions of a second thread and having a first return stack corresponding to the first thread and a second return stack corresponding to the second thread, a method includes receiving a branch to subroutine instruction of the first thread; pushing a return address corresponding to the branch to subroutine instruction onto the first return stack; when the first return stack is full and borrowing entries from the second return stack is enabled and the second thread is not enabled, the method further comprises removing an oldest return address from the first return stack and pushing the removed oldest return address onto the second return stack; and when the first return stack is full and borrowing entries from the second return stack is not enabled, removing the oldest return address of the first return stack and not storing the removed oldest return address in the second return stack. In one aspect, the method further includes receiving a branch from subroutine instruction of the first thread; popping a return address corresponding to the branch from subroutine instruction from the first return stack; when the second return stack is not empty and borrowing entries from the second return stack is enabled and the second thread is not enabled, popping a return address from the second return stack and storing the popped return address from the second return stack into the first return stack as an oldest address of the first return stack; and providing the return address popped from the first return stack as a branch target address for the branch from subroutine instruction. In a further aspect, when borrowing is not enabled by the borrow enable indicator when popping the return address, maintaining an oldest return address of the first return stack as the oldest return address of the first return stack.

In yet another embodiment, a data processing system includes a processor configured to execute processor instructions of a first thread and processor instructions of a second thread; a first return stack corresponding to the first thread; a second return stack corresponding to the second thread; storage circuitry configured to store a borrow enable indicator corresponding to the second return stack which indicates whether borrowing entries from the second return stack is enabled; and control circuitry configured to push a return address to the first return stack in response to a branch to subroutine instruction in the first thread, wherein: if the first return stack is full and borrowing is enabled by the borrow enable indicator and the second thread is not enabled, the control circuitry is configured to remove the oldest return address from the first return stack and push the removed oldest return address onto the second return stack, and pop a return address from the first return stack in response to a branch from subroutine instruction in the first thread and provide the popped return address to the processor as a branch target address for the branch from subroutine instruction, wherein: if the second return stack is not empty and borrowing is enabled by the borrow enable indicator and the second thread is not enabled, the control circuitry is configured to pop a return address from the second return stack and store the return address popped from the second return stack in the first return stack as the oldest return address of the first stack. In one aspect, the return address pushed to the first return stack in response to the branch to subroutine instruction corresponds to an instruction address of a subsequent instruction which immediately follows the branch instruction.

What is claimed is:

1. A data processing system, comprising:
   a processor configured to execute processor instructions of a first thread and processor instructions of a second thread;
   a first return stack corresponding to the first thread;
   a second return stack corresponding to the second thread;
   storage circuitry configured to store a borrow enable indicator corresponding to the second return stack which indicates whether borrowing entries from the second return stack is enabled; and
   control circuitry configured to push a return address to the first return stack in response to a branch to subroutine instruction in the first thread, wherein:
      if the first return stack is full and borrowing is not enabled by the borrow enable indicator, the control circuitry is configured to remove an oldest return address from the first return stack and not store the removed oldest return address in the second return stack, and
      if the first return stack is full and borrowing is enabled by the borrow enable indicator and the second thread is not enabled, the control circuitry is configured to remove the oldest return address from the first return stack and push the removed oldest return address onto the second return stack.

2. The data processing system of claim 1, wherein the control circuitry is configured to pop a return address from the first return stack in response to a branch from subroutine instruction in the first thread, wherein:
   if the second return stack is not empty and borrowing is enabled by the borrow enable indicator and the second thread is not enabled, the control circuitry is configured to pop a return address from the second return stack and store the return address popped from the second return stack in the first return stack as the oldest return address of the first stack.

3. The data processing system of claim 2, wherein if borrowing is not enabled by the borrow enable indicator when the pop from the first return stack is performed, the control circuitry is configured to maintain an oldest return address of the first return stack as the oldest return address of the first return stack.

4. The data processing system of claim 2, wherein the control circuitry provides the popped return address to the processor as a branch target address of the branch from subroutine instruction.

5. The data processing system of claim 1, wherein the return address pushed to the first return stack in response to the branch to subroutine instruction corresponds to an instruction address of a subsequent instruction which immediately follows the branch instruction.

6. The data processing system of claim 1, further comprising:
   a first branch target buffer (BTB) corresponding to the first thread, the first branch target buffer having a plurality of entries, each entry comprising a branch instruction address field, a branch target address field, a pop field, and a push field;
   a second branch target buffer (BTB) corresponding to the second thread, the second branch target buffer having a plurality of entries each entry comprising a branch instruction address field, a branch target address field, a pop field, and a push field;
first BTB control circuitry coupled to the first BTB and the first return stack; and
second BTB control circuitry coupled to the second BTB and the second return stack.

7. The data processing system of claim 6, wherein the first BTB control circuitry is configured to determine whether a branch instruction address of the branch to subroutine instruction hits or misses in the first BTB, and when the branch instruction address hits in the first BTB, the first BTB control circuitry is configured to provide a hit signal and a push signal to the control circuitry, wherein the control circuitry is configured to perform the push of the return address in response to the hit signal and the push signal.

8. The data processing system of claim 7, wherein when the branch instruction address misses in the first BTB, the first BTB control circuitry allocates an entry in the first BTB for the branch to subroutine instruction, wherein a target address of the branch to subroutine instruction is stored in the branch target address field of the allocated entry and the push field of the allocated entry is asserted.

9. The data processing system of claim 7, wherein when the branch instruction addresses misses in the first BTB, the processor is configured to resolve the branch to subroutine instruction and provide a processor push signal to the control circuitry in response thereto, wherein the first BTB control circuitry is configured to perform the push of the return address in response to the hit signal and the processor push signal.

10. The data processing system of claim 6, wherein the control circuitry is configured to pop a return address from the first return stack in response to a branch from subroutine instruction in the first thread, wherein:
if the second return stack is not empty and borrowing is enabled by the borrow enable indicator and the second thread is not enabled, the control circuitry is configured to pop a return address from the second return stack and store the return address popped from the second return stack in the first return stack as the oldest return address of the first stack.

11. The data processing system of claim 10, wherein the first BTB control circuitry is configured to determine whether a branch instruction address of the branch from subroutine instruction hits or misses in the first BTB, and when the branch instruction address hits in the first BTB, the first BTB control circuitry is configured to provide a hit signal and a pop signal to the control circuitry, wherein the control circuitry is configured to perform the pop of the return address in response to the hit signal and the pop signal.

12. The data processing system of claim 10, wherein when the branch instruction address misses in the first BTB, the first BTB control circuitry allocates an entry in the first BTB for the branch from subroutine instruction, wherein a target address is not stored in the branch target address field of the allocated entry and the pop field of the allocated entry is asserted.

13. The data processing system of claim 10, wherein when the branch instruction addresses misses in the first BTB, the processor is configured to resolve the branch from subroutine instruction and provide a processor pop signal to the control circuitry in response thereto, wherein the first BTB control circuitry is configured to perform the pop of the return address in response to the hit signal and the processor pop signal.

14. The data processing system of claim 1, wherein the borrow enable indicator indicates whether borrowing is enabled for the first thread from the second return stack.

15. The data processing system of claim 14, wherein the storage circuitry is further configured to store a second borrow enable indicator corresponding to the first return stack which indicates whether borrowing is enabled for the second thread from the first return stack.

16. A method implemented in a data processing system configured to execute processor instructions of a first thread and processor instructions of a second thread and having a first return stack corresponding to the first thread and a second return stack corresponding to the second thread, the method comprises:
receiving a branch to subroutine instruction of the first thread;
pushing a return address corresponding to the branch to subroutine instruction onto the first return stack;
when the first return stack is full and borrowing entries from the second return stack is enabled and the second thread is not enabled, the method further comprises removing an oldest return address from the first return stack and pushing the removed oldest return address onto the second return stack; and
when the first return stack is full and borrowing entries from the second return stack is not enabled, removing the oldest return address of the first return stack and not storing the removed oldest return address in the second return stack.

17. The method of claim 16, further comprising:
receiving a branch from subroutine instruction of the first thread;
popping a return address corresponding to the branch from subroutine instruction from the first return stack;
when the second return stack is not empty and borrowing entries from the second return stack is enabled and the second thread is not enabled, popping a return address from the second return stack and storing the popped return address from the second return stack into the first return stack as an oldest address of the first return stack; and
providing the return address popped from the first return stack as a branch target address for the branch from subroutine instruction.

18. The method of claim 17 wherein when borrowing is not enabled by the borrow enable indicator when popping the return address, maintaining an oldest return address of the first return stack as the oldest return address of the first return stack.

19. A data processing system, comprising:
a processor configured to execute processor instructions of a first thread and processor instructions of a second thread;
a first return stack corresponding to the first thread;
a second return stack corresponding to the second thread;
storage circuitry configured to store a borrow enable indicator corresponding to the second return stack which indicates whether borrowing entries from the second return stack is enabled; and
control circuitry configured to:
push a return address to the first return stack in response to a branch to subroutine instruction in the first thread, wherein:
if the first return stack is full and borrowing is enabled by the borrow enable indicator and the second thread is not enabled, the control circuitry is configured to remove the oldest return address from the first return stack and push the removed oldest return address onto the second return stack, and pop a return address from the first return stack in response to a branch from subroutine instruction in the first thread and provide the popped return address to the processor as a branch target address for the branch from subroutine instruction, wherein:

if the second return stack is not empty and borrowing is enabled by the borrow enable indicator and the second thread is not enabled, the control circuitry is configured to pop a return address from the second return stack and store the return address popped from the second return stack in the first return stack as the oldest return address of the first stack.

20. The data processing system of claim 19, wherein the return address pushed to the first return stack in response to the branch to subroutine instruction corresponds to an instruction address of a subsequent instruction which immediately follows the branch instruction.

* * * * *